(12) United States Patent
Erhart

(10) Patent No.: US 9,770,043 B2
(45) Date of Patent: Sep. 26, 2017

(54) METHOD OF PREPARING A BEVERAGE USING A HOT WATER DISPENSER ADAPTER

(71) Applicant: Allan Erhart, Kennewick, WA (US)

(72) Inventor: Allan Erhart, Kennewick, WA (US)

( * ) Notice: Subject to any disclaimer, the term of this patent is extended or adjusted under 35 U.S.C. 154(b) by 0 days.

(21) Appl. No.: 15/401,260

(22) Filed: Jan. 9, 2017

(65) Prior Publication Data

US 2017/0208832 A1      Jul. 27, 2017

Related U.S. Application Data

(62) Division of application No. 15/170,095, filed on Jun. 1, 2016, now Pat. No. 9,585,510.

(60) Provisional application No. 62/388,212, filed on Jan. 22, 2016.

(51) Int. Cl.
| | |
|---|---|
| *A23F 3/18* | (2006.01) |
| *A23F 5/26* | (2006.01) |
| *A23L 2/39* | (2006.01) |
| *B65D 85/804* | (2006.01) |
| *B65D 43/16* | (2006.01) |
| *A47J 31/44* | (2006.01) |
| *A23G 1/56* | (2006.01) |

(52) U.S. Cl.
CPC .................. *A23F 5/26* (2013.01); *A23F 3/18* (2013.01); *A23F 5/262* (2013.01); *A23G 1/56* (2013.01); *A23L 2/39* (2013.01); *A47J 31/4407* (2013.01); *B65D 43/16* (2013.01); *B65D 85/8043* (2013.01)

(58) Field of Classification Search
CPC .............. A47J 31/0673; A47J 31/4407; B65D 85/8043; B65D 43/16; A23V 2002/00; A23G 1/56; A23F 3/18; A23F 5/262; A23F 5/26; A23L 2/39
See application file for complete search history.

(56) References Cited

U.S. PATENT DOCUMENTS

| | | | | |
|---|---|---|---|---|
| 1,996,505 | A * | 4/1935 | Ducker ................... | D06F 47/06 100/125 |
| 5,235,901 | A * | 8/1993 | MacLennan ........ | B01F 3/04808 137/170.1 |
| 2011/0089059 | A1 * | 4/2011 | Lane ...................... | B65D 47/08 206/222 |
| 2011/0166910 | A1 * | 7/2011 | Marina ............... | B65D 51/2807 705/7.29 |
| 2013/0213240 | A1 * | 8/2013 | O'Brien ................. | A47J 31/38 99/297 |
| 2015/0173453 | A1 * | 6/2015 | Liu .......................... | A43B 9/02 36/4 |
| 2017/0129665 | A1 * | 5/2017 | Rolfes ................ | B65D 51/2821 |

\* cited by examiner

*Primary Examiner* — Anthony Weier

(57) ABSTRACT

A hot water dispenser adapter device includes a housing unit having an open proximal top and a distal closed bottom defining a brewing chamber for holding an impermeable pierceable cartridge, the cartridge having a top and a bottom and containing a beverage extract, the distal closed bottom having at least one outlet pipe for externally connecting the bottom of the impermeable pierceable cartridge for outflow of liquid; a lid covering the open proximal top of the housing, unit and the brewing chamber, the lid including an external centrally threaded adapter and an internal inlet pipe with a passage-way therethrough, for externally connecting the top of the impermeable pierceable cartridge for inflow of liquid; and a hinge mechanism for connecting the housing unit with the lid.

8 Claims, 4 Drawing Sheets

METHOD OF PREPARING A BEVERAGE USING A HOT WATER DISPENSER ADAPTER

CROSS-REFERENCE TO RELATED APPLICATIONS

This application is a divisional application of and claims the benefit of priority under 35 U.S.C. §120 to U.S. patent application Ser. No. 15/170,095, now U.S. Pat. No. 9585510, titled "HOT WATER DISPENSER ADAPTER DEVICE," filed on Jun. 1, 2016, which claims the benefit of priority under 35 U.S.C. §119(e) to U.S. Provisional Patent Application Ser. No. 62/388,212, titled "JAVA JET," filed on Jan. 22, 2016, the disclosure of each of which is hereby incorporated by reference in their entireties for all purposes.

FIELD OF THE INVENTION

Embodiments of the present disclosure relate to a hot water dispenser adapter device, and more particularly to a hot water dispenser adapter device for brewing coffee, tea, cocoa, apple cider and the like.

BACKGROUND OF INVENTION

There are a number of devices that can accommodate single-serve containers such as single-serve coffee containers. These types of devices and containers can be used to prepare only enough coffee for a single person. In addition, using these devices and containers can result in reducing the amount of time needed to brew coffee and simplifying the brewing process by eliminating the need to measure out specific portions, flavorings. and other additives from large bulk containers. The containers can also help to keep the unused product fresher by individually packaging portions separately without the need to expose the entire supply batch to air and light. However, given the inconvenience and expense of having to purchase a large machine to brew a single cup of coffee, there remains a need in the art for other types of devices that are more convenient o the consumer.

SUMMARY OF THE INVENTION

The presently disclosed embodiments are directed to solving one or more of the problems presented in the prior art, described above, as well as providing additional features that will become readily apparent by reference to the following detailed description when taken in conjunction with the accompanying drawings.

In an embodiment, the disclosure provides a hot water dispenser adapter device that includes a housing unit having an open proximal top and a distal closed bottom defining a brewing chamber for holding an impermeable pierceable cartridge, the cartridge having a top and a bottom and containing a beverage extract such as a K-cup and the like, the distal closed bottom having at least one outlet pipe for externally connecting the bottom of the impermeable pierceable cartridge for outflow of liquid; a lid covering the open proximal top of the housing unit and the brewing chamber, the lid including an external centrally threaded adapter and an internal inlet pipe with a passage-way therethrough, for externally connecting the top of the impermeable pierceable cartridge for inflow of liquid; and a hinge mechanism for connecting the housing unit with the lid.

In another embodiment, the disclosure provides a hot water dispenser adapter device that includes a hooking member connected on an outer perimeter of the lid; and a lip surrounding an outer perimeter of the open proximal top of the housing unit, wherein the hooking member is reversibly attachable to the lip of the housing unit.

In another embodiment, the disclosure provides a hot water dispenser adapter device, wherein the hinge mechanism includes at least one hinge connector on each of the housing unit and the lid, and a connecting hinge pin.

In another embodiment, the disclosure provides a hot water dispenser adapter device, wherein the housing unit and lid are made of a plastic, a metal, a composite material, or combination thereof.

In another embodiment, the disclosure provides a hot water dispenser adapter device, wherein the housing unit and lid are made of high density polyethylene.

In another embodiment, the disclosure provides a hot water dispenser adapter device, wherein the externally threaded adapter attaches to a standard M22x1 threaded female hot water dispenser adapter device.

In another embodiment, the disclosure provides a hot water dispenser adapter device, wherein the brewing chamber is in a shape to accommodate the impermeable pierceable cartridge.

In another embodiment, the disclosure provides a hot water dispenser adapter device, wherein the impermeable pierceable cartridge contains ground coffee, tea, hot chocolate, apple cider, and the like.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, size, or applicability of the disclosure. It should be noted that for clarity and ease of illustration these drawings are not necessarily made to scale.

DETAILED DESCRIPTION OF EXEMPLARY EMBODIMENTS

The following description is presented to enable a person of ordinary skill in the art to make and use embodiments described herein. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the disclosure. Thus, the present disclosure is not intended to be limited to the examples described herein and shown, but is to be accorded the scope consistent with the claims.

The word "exemplary" is used herein to mean "serving as an example illustration," Any aspect or design described herein as "exemplary" is not necessarily to be construed as preferred or advantageous over other aspects or designs.

It should be understood that the specific order or hierarchy of steps in the process disclosed herein is an example of exemplary approaches. Based upon design preferences, it is understood that the specific order or hierarchy of steps in the processes may be rearranged while remaining within the scope of the present disclosure. Any accompanying method claims present elements of the various steps in a sample order, and are not meant to be limited to the specific order or hierarchy presented.

Embodiments of the present disclosure relate to a hot water dispenser adapter device, which includes an adapter that can be connected directly to threaded female hot water dispenser, and a beverage producing container for preparing a brewed beverage, including but not limited to, brewed coffee, tea, cocoa, apple cider and the like. For example, in some embodiments the threaded female hot water dispenser may be a standard M22x1 threaded female hot water dispenser. Examples of hot water dispensers include the InSinkErator® instant hot water dispenser and the like. Such hot water dispensers are capable of dispensing hot water up to about 190° F. The high temperatures are optimal for brewing coffee beverages and the like.

Figure 1:
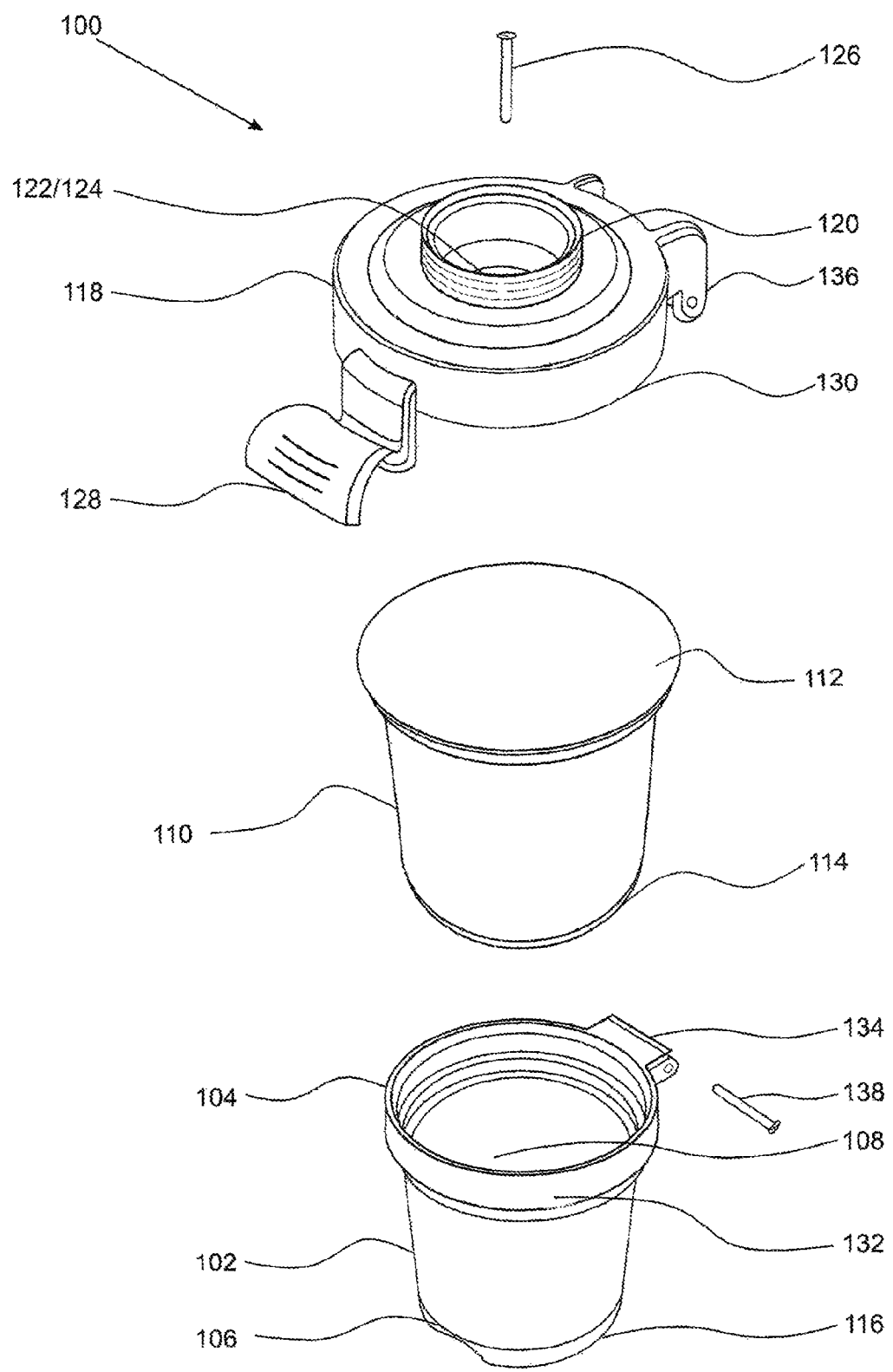
FIG. 1 provides an illustrative embodiment of an exemplary exploded front view of a hot water dispenser adapter device.

FIG. 1 provides an illustrative embodiment of an exemplary exploded front view of a hot water dispenser adapter device 100. In this figure, the adapter 100 includes a housing unit 102 that has an open proximal top 104 and a distal closed bottom 106, which defines a brewing chamber 108 for holding an impermeable pierceable cartridge 110.

As shown in this figure, the cartridge 110 has a top portion 112 and a bottom portion 114, and contains a beverage extract such as ground coffee, tea, hot chocolate, and the like. The distal closed bottom 106 of the housing unit 102 includes at least one outlet pipe 116 for externally connecting the bottom portion 114 of the cartridge 110 for outflow of liquid through the cartridge.

The brewing chamber 108 can be in any suitable shape, for example, a shape to accommodate the impermeable pierceable cartridge 110. In embodiments, the impermeable pierceable cartridge can be a K-cup and the like. The cartridge can be either a small, medium or large cartridge depending upon the use, for example, residential or commercial use such as in restaurants and the like.

Also shown in FIG. 1 is a lid 118, which covers the open proximal top 104 of the housing unit 102 and the brewing chamber 108 when in the closed position. The lid 118 includes an external centrally threaded adapter 120, and an internal inlet pipe 122 with a passage-way 124 therethrough. The housing unit 102 can be reversibly attached to an external faucet through the external centrally threaded adapter 120. The passage-way 124 can be created by a needle 126 or any other similarly sharpened instrument for piercing the impermeable pierceable cartridge 110. When the lid 118 is in the closed position and the housing unit 102 is attached to an external faucet, the external centrally threaded adapter 120 and internal inlet pipe 122 with passage-way 124, allows for the inflow of liquid from the faucet through the impermeable pierceable cartridge 110. The lid 118 also includes a hooking member 128, which can be connected onto an outer perimeter 130 of the lid, and which is reversibly attachable to a lip 132 that surrounds an outer perimeter of the open proximal top 104 of the housing unit 102. The lid 118 can toggle between an opened and closed position when connected to the housing unit 102, by virtue of a hinge mechanism, which includes hinge connectors 134 and 136, on each of the housing unit 102 and the lid 118, respectively, and a connecting hinge pin 138.

The hot water dispenser adapter device including the housing unit and the lid can be made of any suitable materials, for example, a plastic, a metal, a composite material, or a combination thereof. The housing unit and lid can also be made of high density polyethylene.

Figure 2A:
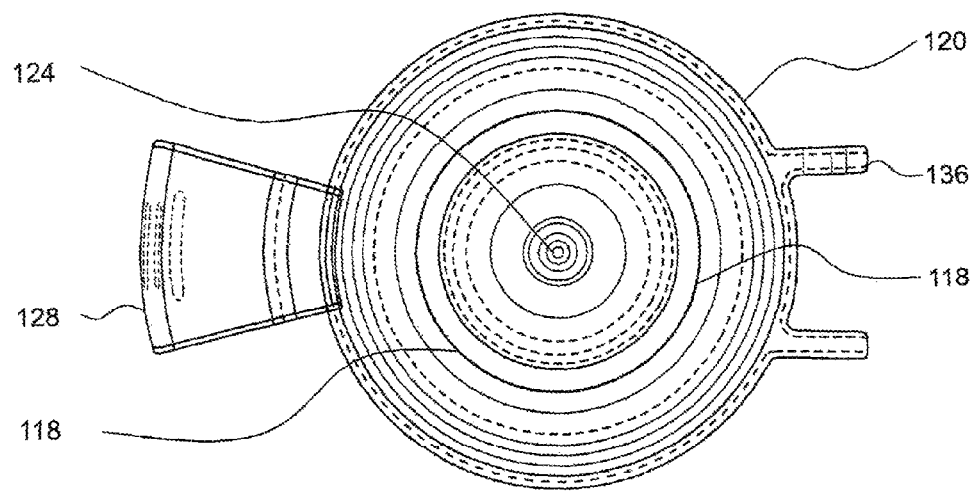
FIGS. 2A, 2B, and 2C provide an illustrative embodiment of an exemplary top, side and bottom view, respectively, of a lid for a hot water dispenser adapter device.
Figure 2B:
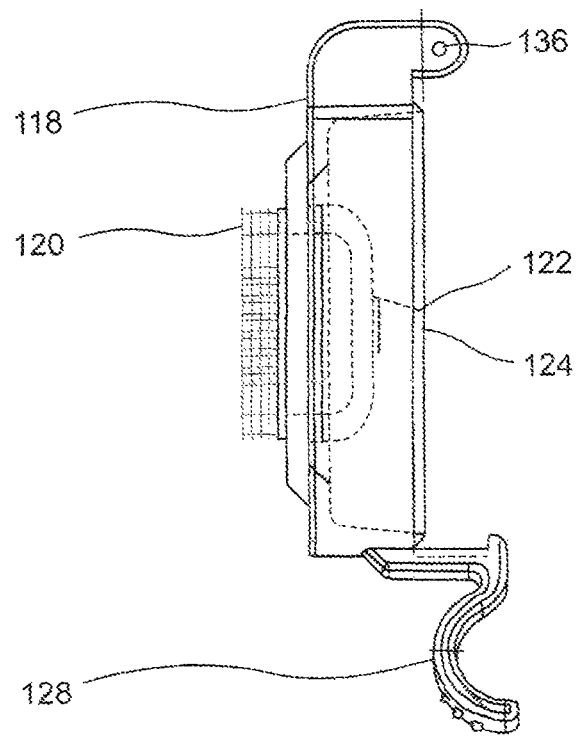
Figure 2C:
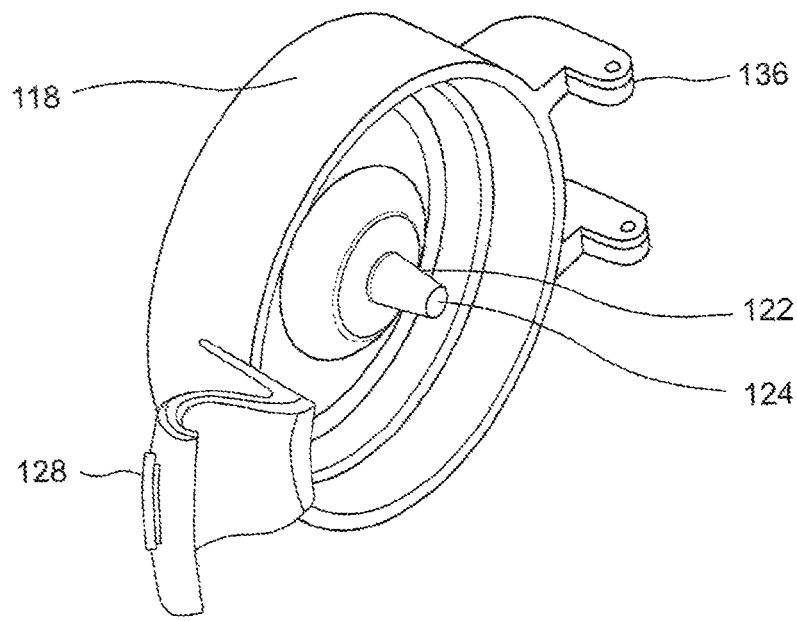

FIGS. 2A, 2B, and 2C provide an illustrative embodiment of an exemplary top, side and bottom view, respectively, of the lid 118 for the hot water dispenser adapter device 100. As shown, the lid 118 includes external centrally threaded adapter 120, the internal inlet pipe 120, the passage-way 124, the hooking member 128, and hinge connector 136.

Figure 3A:
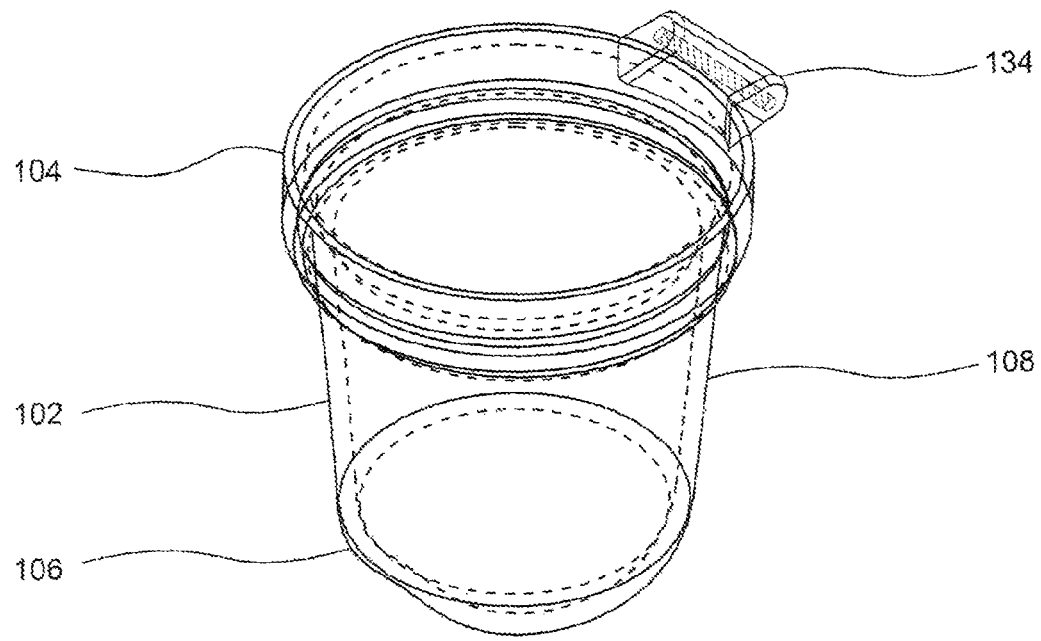
FIGS. 3A and 3B provide an illustrative embodiment of an exemplary front and side view, respectively, of a housing unit of a hot water dispenser adapter device.
Figure 3B:
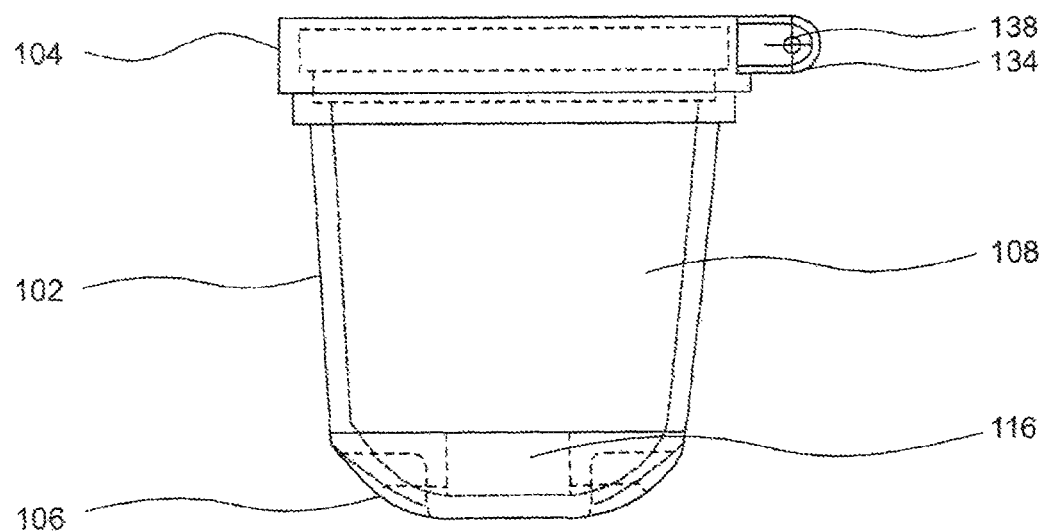

FIGS. 3A and 3B provide an illustrative embodiment of an exemplary front and side view, respectively, of the housing unit 102 for the hot water dispenser adapter device 100. As shown, the housing unit 102 includes the open proximal top 104, distal closed bottom 106, brewing chamber 108, outlet pipe 116, hinge connector 134, and hinge pin 138.

In other embodiments the disclosure provides a method for preparing a beverage using a hot water dispenser adapter device, wherein the dispenser includes: a housing unit having an open proximal top and a distal closed bottom defining a brewing chamber for holding an impermeable pierceable cartridge, the cartridge having a top and a bottom and containing a beverage extract, the distal closed bottom having at least one outlet pipe for externally connecting the bottom of the impermeable pierceable cartridge for outflow of liquid; a lid covering the open proximal top of the housing unit and the brewing chamber, the lid including an external centrally threaded adapter and an internal inlet pipe with a passage-way therethrough, for externally connecting the top of the impermeable pierceable cartridge for inflow of liquid; and a hinge mechanism for connecting the housing unit with the lid.

In embodiments, the method includes attaching the hot water dispenser adapter device containing an impermeable pierceable cartridge to a hot water dispenser adapter device; inflowing hot water through the hot water dispenser adapter device and impermeable pierceable cartridge to brew the coffee, tea, cocoa, or apple cider product in the cartridge; and outflowing the brewed product to prepare the beverage.

While the inventive features have been particularly shown and described with reference to preferred embodiments thereof, it will be understood by those in the art that the foregoing and other changes may be made therein without departing from the sprit and the scope of the disclosure. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus, the breadth and scope of the present disclosure should not be limited by any of the above-described exemplary embodiments.

What is claimed is:

1. A method of preparing a beverage using a hot water dispenser adapter device, the hot water dispenser adapter device including:
    a housing unit having an open proximal top and a distal closed bottom defusing a brewing chamber for holding an impermeable pierceable cartridge, the cartridge having a top and a bottom and containing a beverage extract, the distal closed bottom having at least one outlet pipe for externally connecting the bottom of the impermeable pierceable cartridge for outflow of liquid;
    a lid covering the open proximal top of the housing unit and the brewing chamber, the lid including an external centrally threaded adapter and an internal inlet pipe with a passage-way therethrough, for externally connecting the top of the impermeable pierceable cartridge for inflow of liquid; and
    a hinge mechanism for connecting the housing unit with the lid,
    the method comprising:
    attaching the hot water dispenser adapter device containing an impermeable pierceable cartridge to the hot water dispenser adapter device;
    inflowing hot water through the hot water dispenser adapter device and impermeable pierceable cartridge to brew coffee, tea, cocoa, or apple cider product in the cartridge; and
    outflowing the brewed product to prepare the beverage.

2. The method of preparing a beverage using a hot water dispenser adapter device of claim 1, wherein the hot water dispenser adapter device further comprises:
    a hooking member connected on an outer perimeter of the lid; and
    a lip surrounding an outer perimeter of the open proximal top of the housing unit, wherein the hooking member is reversibly attachable to the lip of the housing unit.

3. The method of preparing a beverage using a hot water dispenser adapter device of claim 1, wherein the hinge mechanism includes at least one hinge connector on each of the housing unit and the lid, and a connecting hinge pin.

4. The method of preparing a beverage using a hot water dispenser adapter device of claim 1, wherein the housing unit and lid are made of a plastic, a metal, a composite material, or a combination thereof.

5. The method of preparing a beverage using a hot water dispenser adapter device of claim 1, wherein the housing unit and lid are made of high density polyethylene.

6. The method of preparing a beverage using a hot water dispenser adapter device of claim 1, wherein the externally threaded adapter attaches to a standard M22x1 threaded female hot water dispenser.

7. The method of preparing a beverage using a hot water dispenser adapter device of claim 1, wherein the brewing chamber is in a shape to accommodate the impermeable pierceable cartridge.

8. The method of preparing a beverage using a hot water dispenser adapter device of claim 1, wherein the impermeable pierceable cartridge contains ground coffee.

* * * * *